United States Patent Office 3,090,792
Patented May 21, 1963

3,090,792
16,17-SECOESTRATRIENES AND D-HOMO STEROIDS DERIVED THEREFROM
David A. Tyner, Glenview, Ill., assignor to G. D. Searle & Co., Chicago, Ill., a corporation of Delaware
No Drawing. Filed Aug. 8, 1960, Ser. No. 47,910
8 Claims. (Cl. 260—348)

The present invention relates to compounds of the formula

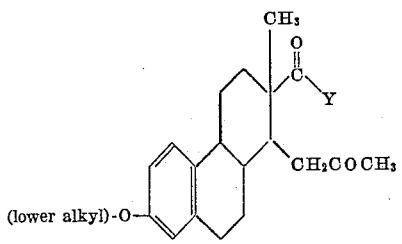

wherein Y is hydrogen or hydroxyl, and to ring closure products thereof, of the formula

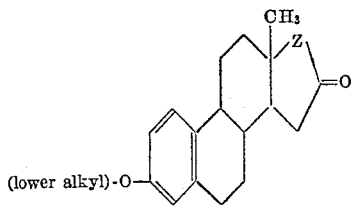

and

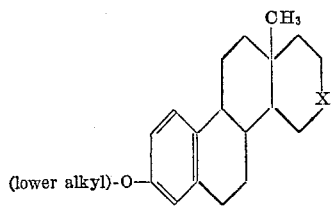

wherein Z is —CH=CH— and

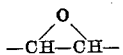

and X is —CH(OH)— and —CO—. By lower alkyl is meant, for example, methyl, ethyl, propyl, isopropyl, butyl, isobutyl, sec-butyl, tert-butyl, pentyl, isopentyl tert-pentyl, neopentyl, hexyl, isohexyl, heptyl and octyl.

This application is a continuation-in-part of my prior copending application, Serial No. 823,299, filed June 29, 1959, issued as U.S. Patent No. 2,950,292 on August 23, 1960.

The 16,17-seco and D-homo compounds to which this invention relates are useful because of their valuable pharmacological properties. In particular, they are estrogenic, anti-androgenic, and lipid shifting agents.

The compounds of this invention are prepared by a route which begins with chromic acid oxidation of a 3-alkoxy - 16 - methyl - 1,3,5(10) - estratriene-16β,17β-diol; among the products obtained are the corresponding 3-alkoxy - 16 - methyl - 16 - oxo - 16,17 - seco - 1,3,5(10)-estratrien-17-al and 3 - alkoxy - 16-methyl-16-oxo-16,17-seco-1,3,5(10)-estrarien-17-oic acid. The aldehyde is subjected to intramolecular condensation to give a 3-alkoxy-D - homo - 1,3,5(10),17 - estratetraen-16-one; the D-ring double bond may be reduced to give a 3-alkoxy-D-homo-1,3,5(10)-estratrien-16-one, or oxidized to give a 3-alkoxy-17,17a - epoxy-D-homo - 1,3,5(10)-estratrien-16-one. A compound of the former type is further converted, by reduction of the carbonyl group, to a 3-alkoxy-16-hydroxy-D-homo-1,3,5(10)-estratriene.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in pounds per square inch, and relative amounts of materials in parts by weight, except as otherwise noted.

Example 1

*3 - methoxy - 16 - methyl - 16 - oxo - 16,17 - seco - 1,3,5(10) - estratrien - 17 - al and 3 - methoxy - 16 - methyl-16 - oxo - 16,17 - seco - 1,3,5(10) - estratrien - 17 - oic acid.*—At 18° a stirred solution of 3 parts of 3-methoxy-16α-methyl-1,3,5(10)-estratriene-16β,17β-diol in 80 parts of acetone is treated with 3 parts of chromic anhydride solution which is 8 Normal with respect to both chromium and sulfuric acid, and immediately diluted with 8 parts of methanol, and then with 100 parts of dilute hydrochloric acid. This aqueous mixture is extracted with dichloromethane. The extract is washed successively with hydrochloric acid, water, 5% sodium hydroxide, water, and dried. The organic solution is dried over sodium sulfate and evaporated to yield a neutral oil. On crystallization from a mixture of benzene and cyclohexane there is obtained 3 - methoxy - 16α - methyl-16β-hydroxy-1,3,5(10)-estratrien-17-one melting at about 160–162°. The mother liquor is subjected to chromatography on a silica column. The column is developed with benzene solutions containing increasing concentrations of ethyl acetate. Additional yield of 3-methoxy - 16α - methyl-16β-hydroxy-1,3,5(10)-estratrien-17-one is obtained from the eluates containing 10% ethyl acetate and benzene. The 5% ethyl acetate eluate yields an oily product with a specific rotation in chloroform at +65°. This product is 3-methoxy - 16 - methyl - 16 - oxo - 16,17 - seco - 1,3,5(10)-estratrien-17-al of the structural formula

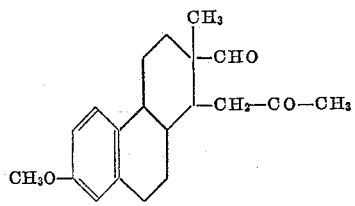

The same product can be obtained in high yield by lead tetraacetate cleavage of 3-methoxy-16α-methyl-1,3,5(10)-estratriene-16β,17β-diol. Still an additional product can be obtained from the alkaline washes of the chromic anhydride oxidation mixture discribed above. Upon acidification of these washes a solid is obtained which, recrystallized from aqueous ethanol, melts at about 191–193° C. and which has been identified as 3-methoxy-16-methyl - 16 - oxo - 16,17 - seco - 1,3,5(10) - estratrien-17-oic acid.

Example 2

*3 - ethoxy - 16 - methyl - 16 - oxo - 16,17 - seco - 1,3,5(10) - estratrien - 17 - al and 3 - ethoxy - 16 - methyl-16 - oxo - 16,17 - seco-1,3,5(10)-estratrien-17-oic acid.*—Substitution of 3.3 parts of 3 - ethoxy - 16α - methyl - 1,3,5(10) - estratriene - 16β,17β - diol for the 3 - methoxy-16α - methyl - 1,3,5(10) - estratriene - 16β,17β - diol of Example 1 gives, by the procedure therein detailed, 3-ethoxy - 16 - methyl - 16 - oxo - 16,17 - seco - 1,3,5(10)-estratrien - 17 - al and 3 - ethoxy - 16 - methyl - 16 - oxo-16,17 - seco - 1,3,5(10) - estratrien - 17 - oic acid.

Example 3

*3 - methoxy - D - homo - 1,3,5(10),17 - estratetraen-16 - one.*—A mixture of 20 parts of 3 - methoxy - 16-methyl - 16 - oxo - 16,17 - seco - 1,3,5(10) - estratrien-17-al, 40 parts of sodium acetate and 150 parts of acetic acid is heated under reflux in a nitrogen atmosphere for 5 hours. At the end of this time water is added to the point of incipient precipitation, and the resultant mixture is cooled. The solid material thus obtained is removed by filtration to give 3 - methoxy - D - homo - 1,3,5(10) - estratetraen - 16 - one, melting at about 147–148°. The structure may be expressed as

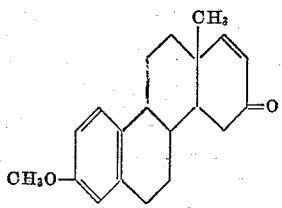

Example 4

*3 - ethoxy - D - homo - 1,3,5(10),17 - estratetraen - 16-one.*—Substitution of 20 parts of 3 - ethoxy - 16 - methyl - 16 - oxo - 16,17 - seco - 1,3,5(10) - estratrien - 17 - al for the 3 - methoxy - 16 - oxo - 16,17 - seco - 1,3,5(10) - estratrien - 17 - al of Example 3 gives, by the procedure therein detailed, 3 - ethoxy - D - homo - 1,3,5(10),17 - estratetraen - 16 - one.

Example 5

*3 - methoxy - 17,17α - epoxy - D - homo - 1,3,5(10)-estratrien - 16 - one.*—To a mixture of 10 parts of 3 - methoxy - D - homo - 1,3,5(10),17 - estratetraen - 16 - one, 640 parts of methanol and 4 parts of 20% aqueous sodium hydroxide maintained at 40–45° is added 5 successive 10-part portions of 30% hydrogen peroxide over about 40 minutes. The resultant mixture is allowed to stand at room temperatures for about 1½ hours and then water is added to incipient turbidity; the mixture thus obtained is cooled to 5° overnight. The precipitate which forms is removed by filtration, and recrystallized twice from ethanol to give 3 - methoxy - 17,17α - epoxy - D - homo-1,3,5(10) - estratrien - 16 - one, melting at 142–144°.

Example 6

*3 - methoxy - D - homo - 1,3,5(10) - estratrien - 16-one.*—A mixture of 6 parts of 3 - methoxy - D - homo - 1,3,5(10),17 - estratetraen - 16 - one, 225 parts of ethyl acetate and 0.6 part of 5% palladium-on-charcoal is treated with hydrogen at atmospheric pressure for about 10 minutes. The reaction mixture is subjected to filtration, and the filtrate is concentrated to about 40 parts. The resultant mixture is cooled to 5° for several hours, and the precipitate which forms is removed by filtration. The solid material thus obtained is recrystallized from ethyl acetate to give 3 - methoxy - D - homo - 1,3,5(10) - estratrien - 16-one, metling at 142–146°.

Example 7

*3 - methoxy - 16 - hydroxy - D - homo - 1,3,5(10)-estratrien.*—To a mixture of 18 parts of 3 - methoxy - D-homo - 1,3,5(10) - estratrien - 16 - one and 80 parts of isopropyl alcohol is added a solution of 4 parts of sodium borohydride in 50 parts of water. The resultant reaction mixture is allowed to stand at 60° for about 20 minutes, and then water is added until precipitation occurs. The solid material is removed by filtration, and recrystallized twice from aqueous ethanol to give 3 - methoxy - 16 - hydroxy - D - homo - 1,3,5(10) - estratrien, melting at 140–144°.

What is claimed is:
1. A compound of the formula

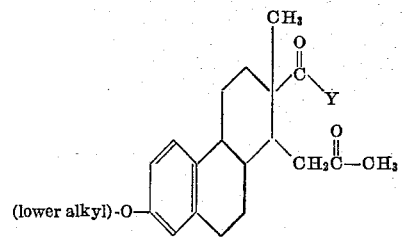

wherein Y is a member of the class consisting of hydrogen and hydroxyl.

2. 3 - methoxy - 16 - methyl - 16 - oxo - 16,17 - seco-1,3,5(10) - estratrien - 17 - al.

3. 3 - methoxy - 16 - methyl - 16 - oxo - 16,17 - seco-1,3,5(10) - estratrien - 17 - oic acid.

4. A compound of the formula

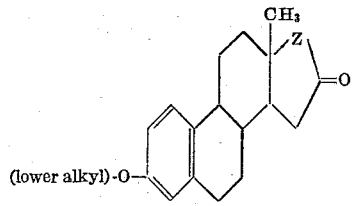

wherein Z is a member of the class consisting of

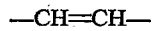

and

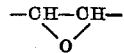

5. 3 - methoxy - D - homo - 1,3,5(10),17 - estratetraen-16 - one.

6. 3 - methoxy - 17,17a - epoxy - D - homo - 1,3,5(10)-estratrien-16-one.

7. A compound of the formula

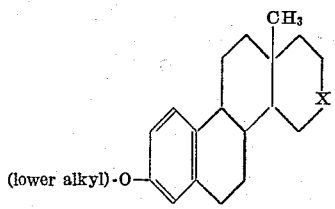

wherein X is carbonyl.

8. 3 - methoxy - D - homo - 1,3,5(10) - estratrien - 16-one.

References Cited in the file of this patent

UNITED STATES PATENTS

| | | |
|---|---|---|
| 2,275,752 | Goldberg | Mar. 10, 1942 |
| 2,648,679 | Johnson et al. | Aug. 11, 1953 |

OTHER REFERENCES

Elsevier's Encyclopedia of Org. Chem., Series III, volume 14 (supp.), page 274 (1951).

Sheehan et al.: J. Am. Chem. Soc., volume 75, page 6231 (1953).